(12) United States Patent
Huffman et al.

(10) Patent No.: US 11,989,905 B2
(45) Date of Patent: May 21, 2024

(54) SYSTEMS AND METHODS FOR SYNCHRONIZING AN IMAGE SENSOR

(71) Applicant: HERE GLOBAL B.V., Eindhoven (NL)

(72) Inventors: Landis Huffman, Chicago, IL (US); Joshua Michael Finken, Park City, UT (US); Amey Aroskar, North Aurora, IL (US); Sumedh Rasal, Chicago, IL (US); Sanjay Kumar Boddhu, Aurora, IL (US)

(73) Assignee: HERE GLOBAL B.V., Eindhoven (NL)

( * ) Notice: Subject to any disclaimer, the term of this patent is extended or adjusted under 35 U.S.C. 154(b) by 286 days.

(21) Appl. No.: 17/241,487

(22) Filed: Apr. 27, 2021

(65) Prior Publication Data
US 2022/0343531 A1   Oct. 27, 2022

(51) Int. Cl.
*G06T 7/70* (2017.01)
*G01S 19/14* (2010.01)
*G06V 20/56* (2022.01)
*G06V 30/19* (2022.01)
*G06V 30/24* (2022.01)

(52) U.S. Cl.
CPC ............... *G06T 7/70* (2017.01); *G01S 19/14* (2013.01); *G06V 20/56* (2022.01); *G06V 30/1918* (2022.01); *G06V 30/2552* (2022.01); *G06T 2207/20048* (2013.01); *G06T 2207/30241* (2013.01)

(58) Field of Classification Search
None
See application file for complete search history.

(56) References Cited

U.S. PATENT DOCUMENTS 10,189,567 B2   1/2019   Chen et al.
10,321,116 B2   6/2019   Metzler et al.
(Continued)

FOREIGN PATENT DOCUMENTS

| CA | 3161560 A1 * | 6/2021 | ............ G06T 17/00 |
| CN | 103711050 A * | 4/2014 | |
| WO | WO-2022074643 A1 * | 4/2022 | |

OTHER PUBLICATIONS

STIC provided machine translation of Chen, et al. CN103711050 A (Year: 2014).*

(Continued)

*Primary Examiner* — Tyler W. Sullivan
(74) *Attorney, Agent, or Firm* — Peter H. Yu; HERE GLOBAL B.V.

(57) ABSTRACT

Systems and methods for synchronization are provided. In some aspects, a method for synchronizing an image sensor is provided. The method includes receiving image data captured using an image sensor that is moving along a pathway, and assembling an image sensor trajectory using the image data. The method also includes receiving position data acquired along the pathway using a position sensor, wherein timestamps for the image data and position data are asynchronous, and assembling a position sensor trajectory using the position data. The method further includes generating a spatial transformation that aligns the image sensor trajectory and position sensor trajectory, and synchronizing the image sensor based on the spatial transformation.

10 Claims, 9 Drawing Sheets

(56) References Cited

U.S. PATENT DOCUMENTS

| | | | |
|---|---|---|---|
| 11,282,291 B1* | 3/2022 | Boardman | G06T 1/0007 |
| 2017/0091923 A1 | 3/2017 | Siercks et al. | |
| 2018/0158200 A1* | 6/2018 | Metzler | G01C 15/00 |
| 2018/0232947 A1* | 8/2018 | Nehmadi | G01S 7/295 |
| 2019/0301873 A1* | 10/2019 | Prasser | G01C 21/3848 |
| 2021/0173094 A1* | 6/2021 | Chen | G01S 19/485 |
| 2021/0398300 A1* | 12/2021 | Gupta | G06T 7/73 |

OTHER PUBLICATIONS

J. Demange, "Next-generation positioning for direct georeferencing of multispectral imagery from an Unmanned Aerial System (UAS): applications in Precision Agriculture", Thesis, U. of Tasmania, Jun. 7, 2019.

S. Zhang, "Improving Details of Building Facades in Open LiDAR Data Using Ground Images," Remote Sensing, vol. 11, 420, Feb. 18, 2019.

* cited by examiner

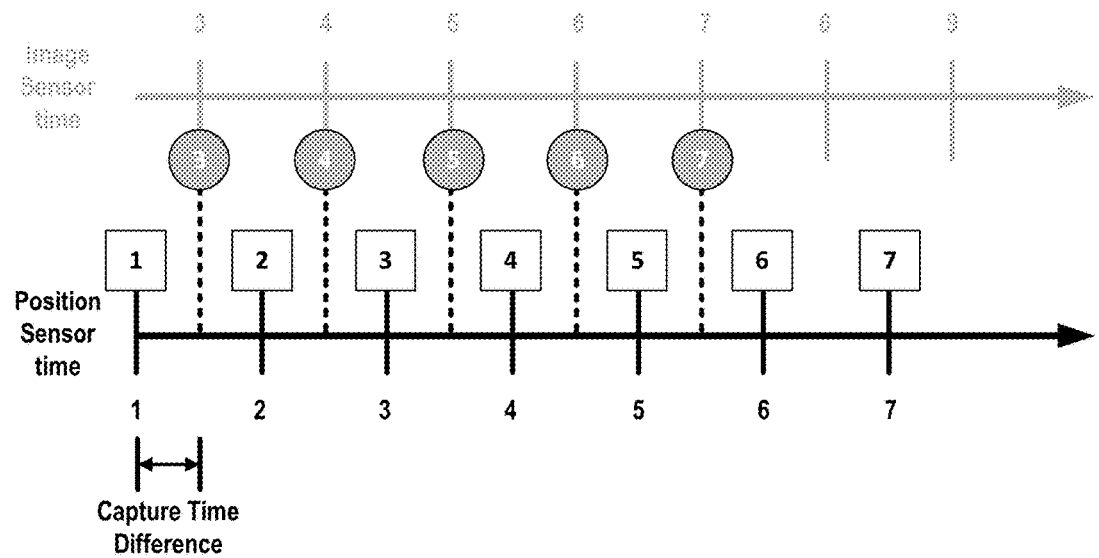
FIG. 1A
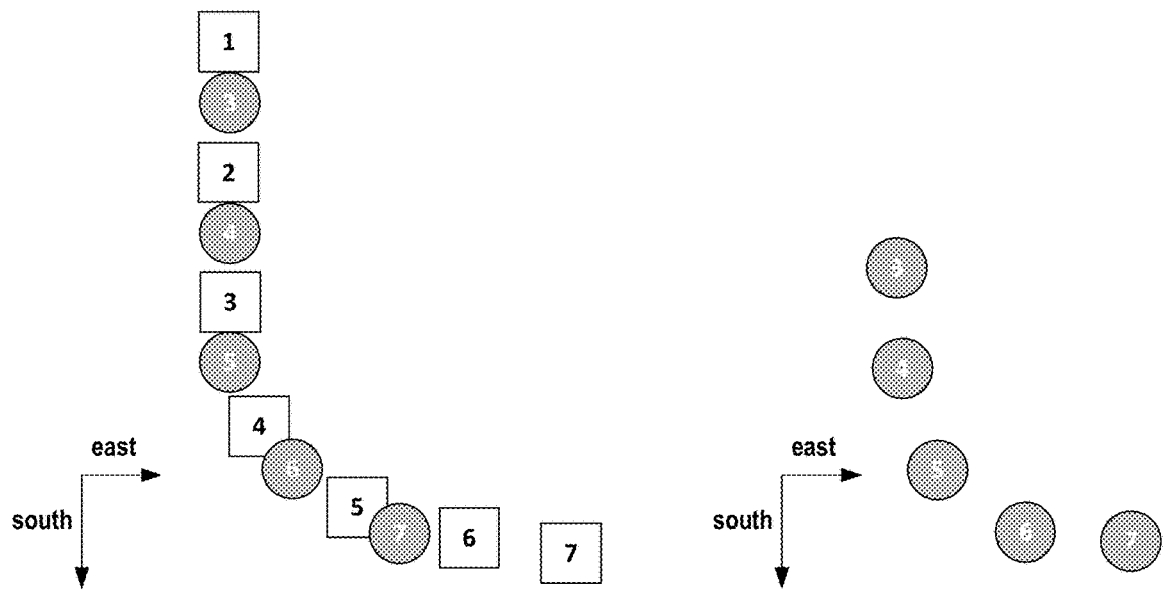
FIG. 1B
FIG. 1C

SYSTEMS AND METHODS FOR SYNCHRONIZING AN IMAGE SENSOR

BACKGROUND

The present disclosure relates generally to mapping applications, products and services, and more specifically to systems and methods for synchronizing an image sensor.

Mapping applications often utilize video imagery acquired by cameras to characterize a scenery. For instance, images can be used to estimate the location of various map attributes, such as road signs, buildings, venues, vending machines, and other objects. Such localization from imagery relies on the availability and accuracy of image position, which is typically provided by way of Global Navigation Satellite system (GNSS) measurements. If image positions are incorrect, however, then any location of an object derived therefrom is also inaccurate, potentially to a greater degree.

Accurate positioning of a moving camera, and associated images, typically requires simultaneously taking position measurements (e.g. using GNSS) and synchronizing the positions with each video frame. Such synchronization is challenging because image and position data is usually acquired using different sensors, even in devices that including both capabilities (e.g. a smartphone, or navigation system). These sensors commonly operate independently, and have different internal clocks that timestamp the acquisition of their respective data. This can result in data asynchronicity, which can then lead to errors in image position.

Accordingly, map providers face significant technical challenges and need improved approaches for use in mapping applications and services, as well as other applications.

SUMMARY

The present disclosure overcome the shortcomings of prior technologies. In particular, a novel approach for synchronization is provided, as detailed below.

In accordance with aspect of the disclosure, a method for synchronizing an image sensor is provided. The method includes receiving image data captured using an image sensor that is moving along a pathway, and assembling an image sensor trajectory using the image data. The method also includes receiving position data acquired along the pathway using a position sensor, wherein timestamps for the image data and position data are asynchronous, and assembling a position sensor trajectory using the position data. The method further includes generating a spatial transformation that aligns the image sensor trajectory and position sensor trajectory, and synchronizing the image sensor based on the spatial transformation.

In accordance with another of the disclosure, a system is provided. The system includes a camera configured to capture image data, wherein the camera comprises a camera clock configured to generate timestamps corresponding to the image data, and a processor in communication with the camera. The system also includes at least one memory comprising instructions executable by the processor. The instructions cause the processor to receive image data captured using the camera while the camera is moving along a pathway, and assemble a camera trajectory using the image data. The instructions also cause the processor to receive position data acquired along the pathway using a position sensor, wherein timestamps for the image data and position data are asynchronous, and assemble a position sensor trajectory using the position data. The instructions further cause the processor to generate a spatial transformation that aligns the camera trajectory and position sensor trajectory, and generate a report indicative of the spatial transformation.

In yet another aspect of the present disclosure, a non-transitory computer-readable medium for synchronizing a camera sensor, carrying one or more sequences of one or more instruction. The instructions, when executed by one or more processors, cause a system to perform steps to receive image data captured using an image sensor that is moving along a pathway, and generate an image sensor trajectory using the image data. The instructions also cause a system to receive position data acquired along the pathway using a position sensor, wherein timestamps for the image data and position data are asynchronous, and assemble a position sensor trajectory using the position data. The instructions further cause the system to generate a spatial transformation that aligns the image sensor trajectory and position sensor trajectory, and synchronize the image sensor using the spatial transformation.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The present invention will hereafter be described with reference to the accompanying figures, wherein like reference numerals denote like elements. The embodiments described are presented by way of example, and not by way of limitation, in the accompanying drawings:

FIG. 1A is a graphical illustration showing example timelines for image sensor and position data captures;

FIG. 1B is a graphical illustration showing true positions of the data captures in FIG. 1A;

FIG. 1C is a graphical illustration showing example positions of the image data estimated by interpolation.

DETAILED DESCRIPTION

Figure 2A:
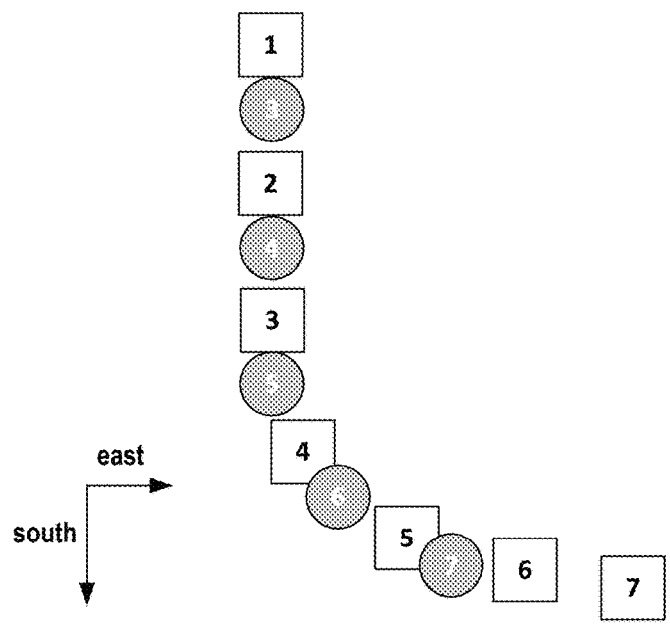
FIG. 2A a graphical illustration showing true positions of example position and image data captures.

Maps and mapping information are important for many applications, products and services. High positional precision for the devices and tools that are used to generate mapping information is paramount to providing high quality maps. However, mapping information is often acquired at different times and using different sensors, which introduces complications and errors into the map-making processes and products. For instance, the location in space of a given object in a scene can be triangulated using images from multiple camera views. However, accurate computation of the object's location requires knowing the position and pose of the camera at the time of image data capture with high accuracy.

The position of image sensors (i.e. cameras), and associated images, can be obtained from ground surveys. For instance, ground control points may be used as points of reference in determining position. However, ground control points require precise, time-consuming, and expensive surveys. Alternatively, image sensor positions can also be obtained by associating acquired image data with measurements from high accuracy position sensors, such as GNSS sensors. However, image sensors and position sensors typically operate independently, and have different internal clocks. This can result in data asynchronicity, which can lead to errors in sensor positioning, and consequently errors in localizing objects in a scene.

To illustrate this problem in the field, FIGS. 1A-C show an example of image sensor and position data being captured while traveling along a pathway. In this example, the travel consists of movement along a first direction (i.e. "south" direction in FIG. 1B) of a coordinate system (e.g. a global coordinate system), followed by movement along a second direction (i.e. "east" direction in FIG. 1B). The sensors are configured to capture video and GNSS readings, for instance, and are co-located (e.g. configured as part of the same device or apparatus, or positioned in the same vehicle). With reference to FIG. 1A, the figure shows timelines corresponding to image sensor and position sensor captures. Both sensors are triggered to capture data periodically and timestamp the measurements using their respective clock readings. For instance, as illustrated in FIG. 1A, the position sensor performs position measurements at t=1 sec, t=2 sec, 3 sec, and so forth, while the image sensor captures images at t=3 sec, 4 sec, 5 sec, and so forth. In the figure, the position data captures are labeled with squares and timestamp numbers "1", "2", "3", on so on, while the image data captures are labeled with circles and timestamp numbers "3", "4", "5" and so on. As appreciated from the figure, the image data captures are not synchronized with the position data captures. That is, timestamps associated with the image data do not match those associated with the position data, which suggests that the images are being captured later compared to the positions. For example, the first image captured with the image sensor (i.e. at t=3 according to the image sensor clock) occurs between t=1 sec and t=2 sec according to the clock of the position sensor.

Position sensors, such as GNSS sensors, typically provide accurate timestamps and positions. By contrast, image sensors, such as cameras, are less reliable. As a result, image sensor position is often either presumed to be known or estimated by other means. For instance, in a simplistic method, image sensor position may be estimated from measurements by other high precision sensors or devices (e.g. GNSS measurements) that are co-located with the image sensor. In particular, the position of the image data captured at a given timestamp may be assigned according to the position of the position sensor at that timestamp. However, as illustrated in FIGS. 1B and 1C, such method gives results that can deviate substantially from the ground truth.

Specifically referring to FIG. 1B, the true positions of co-located image and position sensors traveling along the pathway are shown. On the other hand, FIG. 1C shows the trajectory of the image sensor estimated using the timestamps of FIG. 1A. As appreciated from the figures, the true trajectory of the image sensor (FIG. 1B) is significantly different compared to the estimated trajectory (FIG. 1C) because the assigned positions deviate substantially from where the data was actually captured. To complicate matters furthers, timestamps for the different sensors may have different numerical increments. For example, in the example of FIG. 1A, timestamps for the image sensor may be recorded at 3.1, 4.1, 5.1, 6.1, 7.1, rather than at integer values 3, 4, 5, 6, 7. This presents the added problem there is no corresponding position sensor timestamp. Therefore, an interpolation would be needed to approximate the position of the position sensor at each non-integer timestamp (e.g. t=3.1, 4.1, etc.).

This illustrates an important problem faced by mapping and other applications, which commonly rely on imagery and GNSS measurements for localization, triangulation, geo-registration, and so on. That is, it can be difficult to accurately associate GNSS with imagery by using simplistic methods because differences between sensors (i.e. clock differences) translate into appreciable positioning errors.

In some approaches, image sensor pose (i.e. position and orientation) may be estimated from the image data. For instance, structure-from-motion ("SfM") algorithms can be used to reconstruct a three-dimensional ("3D") scene, and determine camera pose by applying cross-frame point matching and geometric triangulation using a series of two-dimensional ("2D") images from the camera. However, as illustrated in the example of FIGS. 2A-2C, conventional SfM approaches are also prone to errors.

Figure 2B:
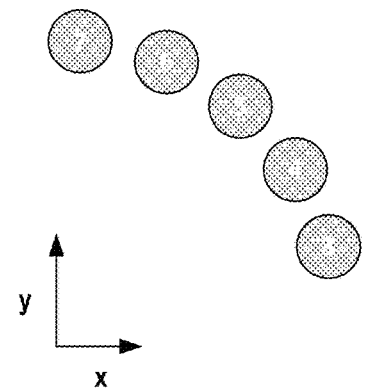
FIG. 2B a graphical illustration showing estimated positions obtained using the image data captures in FIG. 2A.
Figure 2C:
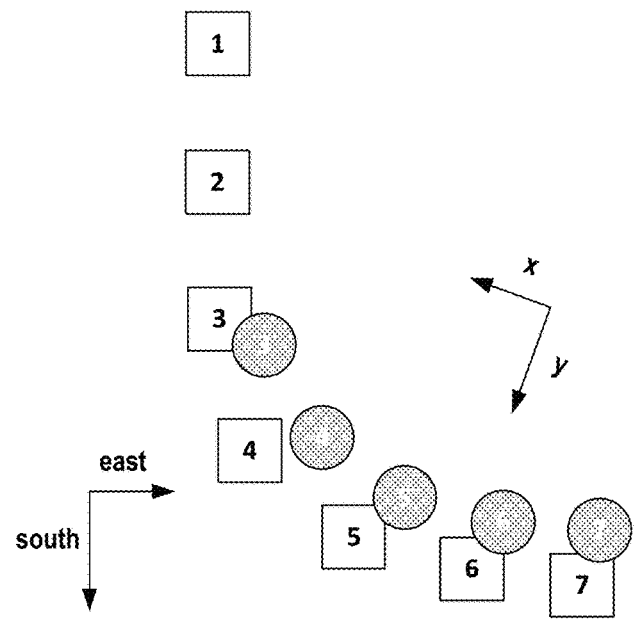
FIG. 2C a graphical illustration showing a transformation of the estimated positions in FIG. 2B.

Referring to FIG. 2A-C, another example is provided that illustrates data captures by co-located image and position sensors traveling along a pathway. Specifically, FIG. 2A shows the true positions of the data captures in a global coordinate system (e.g. an East-North-Up (ENU) coordinate system). As shown, the sensors travel in a first direction (labeled "south" in FIG. 2A) followed by a second direction (labeled "east"), thus making a left-hand turn. As described, positions of the image sensor may be estimated using an SfM algorithm, as shown in FIG. 2B. As appreciated from the figure, although the SfM algorithm is able to deduce that a left-hand turn is made, the absolute positioning for the estimated SfM trajectory is uncertain. This is because the trajectory is computed in a relative coordinate system (x,y), which does not match in direction, position or scale with the global coordinate system of FIG. 2A.

To align the SfM trajectory with the global coordinate system of FIG. 2A, a similarity transform may be used. Such transforms are typically computed based on point correspondences (e.g. using three or more point captures). However, this assumes that the true locations of the image sensor captures are known, which is not typically the case. Alternatively, if timestamps are reliable, one may assign or interpolate positions for all image data using position data (e.g. GNSS data), and then solve for the similarity transform using the SfM points. However, as mentioned, timestamps from different sensors are often asynchronous, which results in positioning errors. In turn, such errors produce poor transforms, as illustrated in FIG. 2C. Therefore, there is a need for improved techniques.

The present disclosure provides a solution that addresses such technical challenges and shortcomings in the field. As described below, the present disclosure introduces a novel approach that improves sensor timing and positioning. In some aspects, the present disclosure describes a method for synchronization. The method assembles sensor trajectories using sensor data captured asynchronously or at different intervals, and generates a spatial transformation that aligns the trajectories. The spatial transformation can then be used to synchronize sensors, and improve sensor timing and positioning.

As appreciated from description below, the present approach provides a number of advantages and improvements to the field of mapping and map-related applications, products and services. For instance, unlike prior technologies, the approach here minimizes or eliminates errors associated with timestamp interpolations, as described above. Moreover, and unlike prior approaches, the present disclosure computes a spatial transformation that aligns trajectories (i.e. sets of positions) of different sensors, rather than individual pairs of positions. Such spatial correspondence between the trajectories of different sensors is robust to outliers and improves alignment and synchronization. As a result, errors in localizing objects in a scene using image data from an image sensor, for instance, are minimized or eliminated. This increases the quality of mapping data and information derived therefrom, which in turn enhances reliability, provides substantial cost savings and improves mapping applications, products and services. For instance, autonomous vehicle applications, which require localization with a high degree of certainty, may benefit from sensor synchronization and improved positioning, in accordance with aspects of the present disclosure. Of course, it may be appreciated by those in the art that high quality sensor timing and positioning can benefit a broad range of applications, products or services in the field.

In the following description, and for the purposes of explanation, numerous specific details are set forth to provide a thorough understanding of the embodiments of the invention. It should be apparent to one skilled in the art, however, that the embodiments of the invention may be practiced with or without these specific details, or with equivalent arrangements. In other instances, well-known structures and devices are shown in block diagram form in order to avoid unnecessarily obscuring the embodiments of the invention.

Figure 3A:
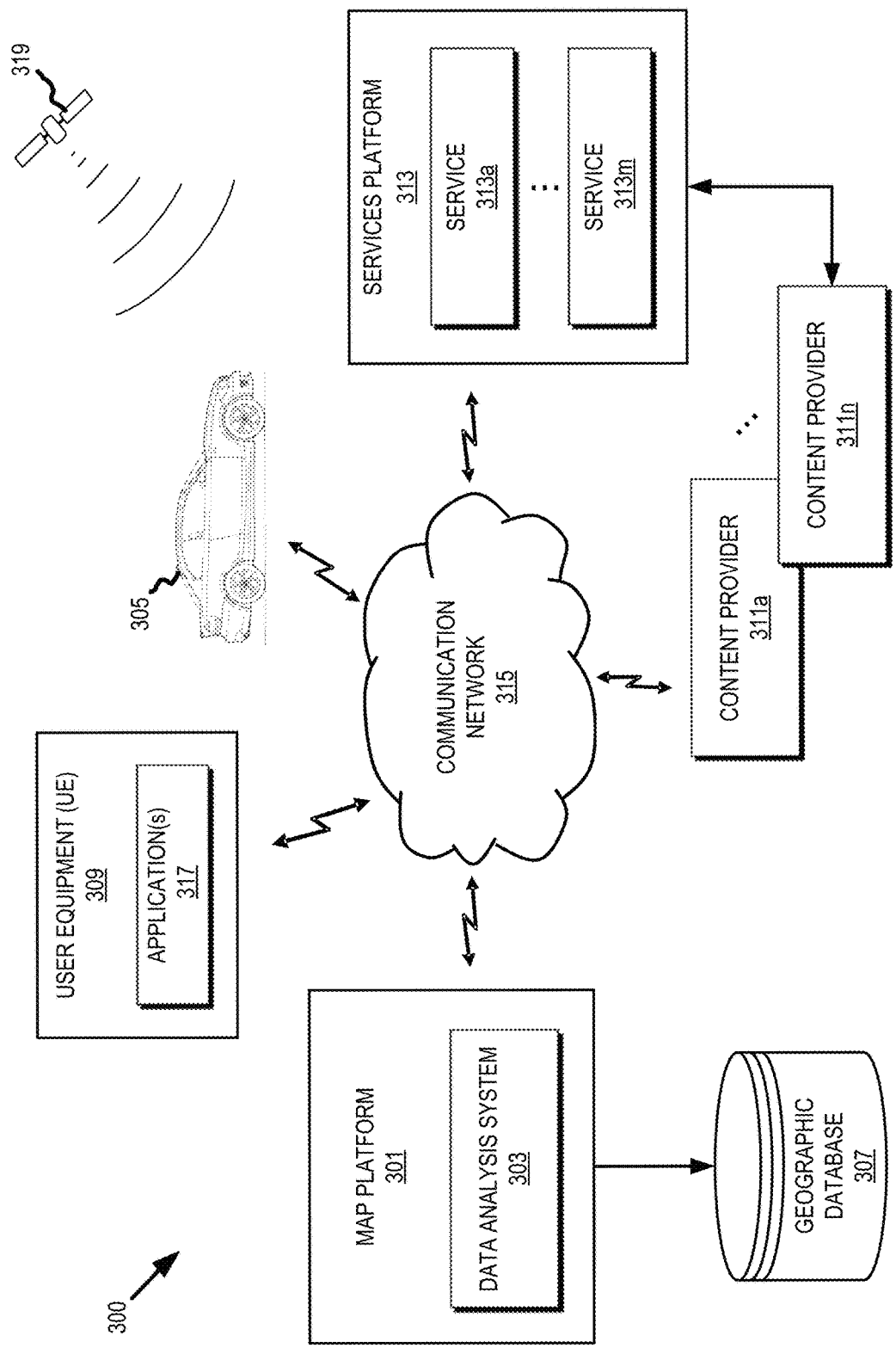
FIG. 3A is a schematic diagram of an example system, in accordance with aspects of the present disclosure.

Referring particularly to FIG. 3A, a schematic diagram of a system 300, in accordance with aspects of the present disclosure, is shown. In general, the system 300 may be any device, apparatus, system, or a combination thereof, that is configured to carry out steps in accordance with the present disclosure. Specifically, the system 300 may include, be part of, or operate in collaboration with, various computers, systems, devices, machines, mainframes, networks, servers, databases, and so forth. In some embodiments, the system 300 may also include portable or mobile terminals or devices, such as cellular phones, smartphones, laptops, tablets, and the like. In this regard, the system 300 may be designed to integrate a variety of hardware, software, and firmware with various capabilities and functionalities. In addition, the system 300 may be capable of operating autonomously or semi-autonomously.

In some embodiments, the system 300 may include a map platform 301 configured to generate and process a variety of mapping information and data, as well as carry out steps in accordance with methods described herein. In addition, the map platform 301 may also communicate and exchange information and data with a variety of other systems, devices and hardware. For instance, as shown in FIG. 3A, the map platform 301 may communicate with one or more vehicle(s) 305, geographic database(s) 307, user equipment (UE) 309, content provider(s) 311a-311n, and/or services platform(s) 313 by way of a communication network 315.

To carry out processing steps, in accordance with aspects of the present disclosure, the map platform 301, and components therein, may execute instructions or sequences of instructions stored in a non-transitory computer-readable medium (not shown in FIG. 3A). The non-transitory computer-readable medium may be part of a memory, database, or other data storage location(s). To execute the instructions, the map platform 301 may include, and utilize a programmable processor, or combination of programmable processors. Alternatively, or additionally, the map platform 301, and components therein, may also include and utilize one or more dedicated processors, or processing units, modules or systems specifically configured (e.g. hardwired, or programmed) to carry out steps, in accordance with methods described herein. In addition, the map platform 301 may further include, and/or share, a variety of interconnected components, including servers, intelligent networking/computing devices and other components, as well as corresponding software and/or firmware. By way of example, processing steps may be carried out using any combination of central processing units (CPUs), graphics processing units (GPUs), Digital Signal Processing (DSP) chips, Application Specific Integrated Circuits (ASICs), Field Programmable Gate Arrays (FPGAs), and so forth.

In some embodiments, the map platform 301 may include a data analysis system 303, as illustrated in FIG. 3A. Although the data analysis system 303 is shown as being part of the map platform 301, the data analysis system 303 may be a stand-alone system. Alternatively, the data analysis system 303 may be a part of the vehicle 305, UE 309, services platform 313 or services 313a-m, or a combination thereof.

The data analysis system 303 may be configured to detect certain objects or features depicted in images, and utilize various algorithms (e.g. machine learning algorithms) implemented using various computing architectures. In some implementations, the data analysis system 303 may utilize one or more neural networks configured to make predictions based on various machine learning models. For example, the data analysis system 303 may utilize a neural network, such as a convolutional neural network, having multiple layers and neurons. Also, data analysis system 303 may utilize receptive fields of a collection of neuron(s) (e.g., a receptive layer) configured to correspond to the area of interest in inputted imagery or data.

In some aspects, the data analysis system 303 may be configured to detect target features from imagery (e.g. top-down images, terrestrial images, and so forth), as well as identify various target points based on the features. The imagery can be obtained from a variety of different sources. For example, the imagery may be captured using aerial vehicles (e.g. airplanes, drones, and so forth), terrestrial vehicles (e.g. mapping vehicles, and the like), satellites, ground surveyors, device end-users, and using other equipment or methods.

In some aspects, target features or target points can be marked or labeled in a large of set of training images. Labeling involves identifying pixels within a given image that correspond to the point or feature. Labeling may be performed automatically using various techniques, manually by a human labeler, a combination of both. The labeled training images may be used to train the machine learning algorithms to find the target points or features in new imagery (i.e., predicting the pixel locations associated with points or features in the input images). In addition to generating data (e.g., position data) corresponding to detected points or features, the data analysis system 103 may also be configured to generate confidence values/uncertainties for the data (e.g. confidence or uncertainty in position).

In some implementations, the machine learning algorithms utilized by the data analysis system 303 may be trained to automatically label imagery depicting areas to be mapped or analyzed. In addition, three-dimensional (3D) coordinates of target points or features can be estimated using multiple views, whereby corresponding points or features are labeled in two or more images (e.g. terrestrial, aerial, and so forth). To this end, the map platform 301 and/or data analysis system 103 can determine pixel correspondences between various target points or features labeled in each of the images. The 3D coordinates can then be determined via a triangulation process from the pixel correspondences in combination with various camera information (e.g., model, position, pointing direction or pose, etc.) of the camera or camera system used to capture the images. Since different sources (e.g., satellites, airplanes, drones, etc.) often provide imagery of different quality and resolution, and uncertainty/error associated with the generated target points may also be computed.

The data analysis system 303 may also be configured to synchronize sensors, in accordance with aspects of the present disclosure. In some aspects, the data analysis system 303 may be configured to receive or access image and position data acquired asynchronously, and assemble sensor trajectories based on the sensor data. In particular, the analysis system 303 may be configured to assemble the image sensor trajectory by determining multiple positions of the image sensor using the image data. To do so, the analysis system 303 may be configured to apply a structure-from-motion (SfM) algorithm configured to generate image sensor pose (i.e. position and orientation) from a number of images. The algorithm may utilize a variety of data and information, including image sensor parameters, speed and direction of movement by the image sensor, and so forth. The data analysis system 303 may then generate a spatial transformation that aligns the image sensor and position sensor trajectories spatially. The data analysis system 303 may apply a point set registration technique to the image sensor trajectory and position sensor trajectory to generate the spatial transformation. Based on the spatial transformation, sensors may be synchronized. For instance, in some implementations, an image sensor clock may be synchronized to the position sensor clock by determining timing offsets between the aligned sensor trajectories. In other implementations, timestamps for the image data acquired by the image sensor may be adjusted based on the timing offsets.

Referring again to FIG. 3A, the map platform 301 and/or data analysis system 303 may have connectivity or access to a geographic database 307. Specifically, the geographic database 307 may store various geographical data and information in a variety of forms and formats. For instance, in one embodiment, the geographic database 307 may include images or image data (e.g. terrestrial, aerial, etc), drive data and so forth. The geographic database 307 may also include other geographical data and information, including GPS, GNSS, and other data/information for use in synchronizing sensors.

In addition, the map platform 301 may also communicate with UE 309 and/or a vehicle 305. In one embodiment, the UE 309, or alternatively the vehicle 305, may execute one or more applications 317 (e.g. software applications) configured to carry out steps in accordance with methods described here. For instance, in one non-limiting example, the application 317 may carry out steps for synchronizing sensors. In another non-limiting example, application 117 may also be any type of application that is executable on the UE 309 and/or vehicle 305, such as autonomous driving applications, mapping applications, location-based service applications, navigation applications, content provisioning services, camera/imaging application, media player applications, social networking applications, calendar applications, and the like. In yet another non-limiting example, the application 317 may act as a client for the data analysis system 303, and perform one or more functions associated with synchronizing sensors, either alone or in combination with the data analysis system 303.

By way of example, the UE 309 may be, or include, an embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 309 may support any type of interface with a user (e.g. by way of various buttons, touch screens, consoles, displays, speakers, "wearable" circuitry, and other I/O elements or devices). Although shown in FIG. 3A as being separate from the vehicle 305, in some embodiments, the UE 309 may be integrated into, or part of, the vehicle 305.

In some embodiments, the UE 309 and/or vehicle 305 may include various sensors for acquiring a variety of different data or information. For instance, the UE 309 and/or vehicle 305 may include one or more camera/imaging devices for capturing imagery (e.g. terrestrial images), global positioning sensors (GPS) or Global Navigation Satellite System (GNSS) sensors for gathering location or coordinates data, network detection sensors for detecting wireless signals, receivers for carrying out different short-range communications (e.g., Bluetooth, Wi-Fi, Li-Fi, near field communication (NFC) etc.), temporal information sensors, audio recorders for gathering audio data, velocity sensors, switch sensors for determining whether one or more vehicle switches are engaged, and others.

The UE 309 and/or vehicle 305 may also include light sensors, height sensors, accelerometers (e.g., for determining acceleration and vehicle orientation), tilt sensors (e.g. for detecting the degree of incline or decline), moisture sensors, pressure sensors, and so forth. Further, the UE 309 and/or vehicle 305 may also include sensors for detecting the relative distance of the vehicle 305 from a lane or roadway, the presence of other vehicles, pedestrians, traffic lights, potholes and any other objects, or a combination thereof. Other sensors may also be configured to detect weather data, traffic information, or a combination thereof. Yet other sensors may also be configured to determine the status of various control elements of the car, such as activation of wipers, use of a brake pedal, use of an acceleration pedal, angle of the steering wheel, activation of hazard lights, activation of head lights, and so forth.

In some embodiments, the UE 309 and/or vehicle 305 may include GPS, GNSS or other satellite-based receivers configured to obtain geographic coordinates from a satellite 319 (FIG. 3A) for determining current location and time. Further, the location can be determined by visual odometry, SfM, triangulation systems such as A-GPS, Cell of Origin, or other location extrapolation technologies, and so forth. In some embodiments, two or more sensors or receivers may be co-located with other sensors on the UE 309 and/or vehicle 305.

The map platform 301 may also have connectivity with various content providers 311. Each content provider 311a-311n may send, or provide access to, various information or data to the data analysis system 303, vehicle 305, geographic database 307, user equipment 309, the services platform 313, and any combination thereof. The content provided may include map content (e.g., geographic data, parametric representations of mapped features, and so forth), textual content, audio content, video or image content (e.g. terrestrial image data), and so forth. In some implementations, the providers 311 may send, or provide access to, information or data for detecting and classifying various features/target points in image data. In some implementations, the providers 311 may also receive and store content from the data analysis system 303, vehicle 305, geographic database 307, UE 109, services platform 313, and any combination thereof. The content providers 311 may also manage access to a central repository of data, and offer a consistent, standard interface to data, such as a repository of the geographic database 307.

As shown in FIG. 3A, the map platform 301 may further connect over the communication network 315 to the services platform 313 (e.g. a third-party platform), which may provide one or more services 313a-m. By way of example, the services platform 313 may provide mapping services, navigation services, travel planning services, notification services, social networking services, content (e.g., audio, video, images, etc.) provisioning services, application services, storage services, contextual information determination services, location-based services, information-based services (e.g., weather, news, etc.), and so forth. In one embodiment, the services platform 313 may use the output of the data analysis system 303 to localize the vehicle 305 or UE 309 (e.g., a portable navigation device, smartphone, portable computer, tablet, etc.), as well as other objects in a scenery, and provide services such as navigation, mapping, advertisement, other location-based services, and so forth.

The communication network 315 may include any number of networks, such as data networks, wireless networks, telephony networks, or combinations thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTELTEC) networks, code division multiple access (CDMA), wideband code division multiple access (WCDMA), wireless fidelity (Wi-Fi®), wireless LAN (WLAN), Bluetooth®, Internet Protocol (IP) data casting, satellite, mobile ad-hoc network (MANET), and the like, or any combination thereof.

The map platform 301, data analysis system 303, vehicle 305, geographic database 307, UE 309, content provider 311, and services platform 313 may communicate with each other, and other components of the system 300, using various communication protocols. By way of example, protocols may include a set of rules defining how the network nodes within the communication network 315 interact with each other based on information and data sent over the communication links. The protocols may be effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information and data over a network are described in the Open Systems Interconnection (OSI) Reference Model.

Communications between the network nodes may be carried out by exchanging discrete packets of data. Each packet may comprise (1) header information associated with a particular protocol, and (2) payload information that follows the header information and contains information that may be processed independently of that particular protocol. In some protocols, the packet may include (3) trailer information following the payload and indicating the end of the payload information. The header may include information such as the source of the packet, its destination, the length of the payload, and other properties used by the protocol. The data in the payload for the particular protocol may include a header and payload for a different protocol associated with a different, higher layer of the OSI Reference Model. The header for a particular protocol may indicate a type for the next protocol contained in its payload. The higher layer protocol may be encapsulated in the lower layer protocol. The headers included in a packet traversing multiple heterogeneous networks, such as the Internet, may include a physical (layer 1) header, a data-link (layer 2) header, an internetwork (layer 3) header and a transport (layer 4) header, and various application (layer 5, layer 6 and layer 7) headers as defined by the OSI Reference Model.

Figure 3B:
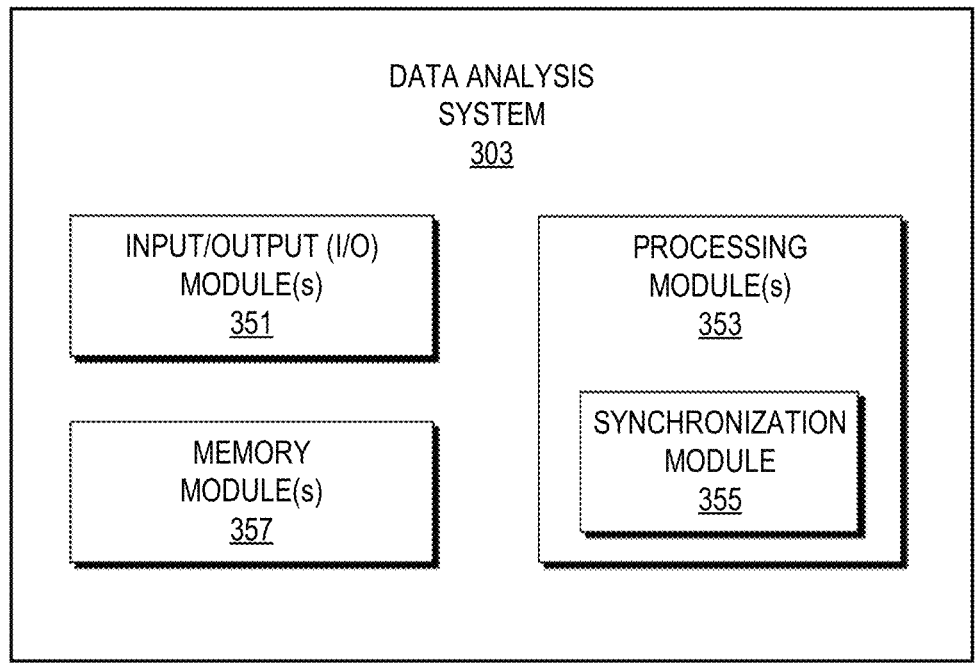
FIG. 3B is a schematic diagram of another example system, in accordance with aspects of the present disclosure.

Referring now to FIG. 3B, a schematic diagram of an example data analysis system 303, in accordance with aspects of the present disclosure, is illustrated. As shown, in some embodiments, the data analysis system 303 may include a number of input/output (I/O) module(s) 351, one or more processing modules 353, including a synchronization module 355, one or more memory module(s) 357, and possibly others. The modules can be implemented using various hardware, firmware, software, as described with reference to the map platform 301 in FIG. 3A. Alternatively, or additionally, modules may also be implemented as a cloud-based service, local service, native application, or combination thereof. Although the modules in FIG. 3B are shown as separate components of the data analysis system 303, it is contemplated that their respective functions may be readily combined into fewer modules, or further separated into more specialized modules.

The I/O module(s) 351 may include any combination of input and output elements for receiving and relaying various data and information. Example input elements may include a mouse, keyboard, touchpad, touchscreen, buttons, and other user interfaces configured for receiving various selections, indications, and operational instructions from a user. Input elements may also include various drives and receptacles, such as flash-drives, USB drives, CD/DVD drives, and other computer-readable medium receptacles, for receiving various data and information. Example output elements may include displays, touchscreens, speakers, LCDs, LEDs, and so on. In addition, I/O modules 351 may also include various communication hardware configured for exchanging data and information with various external computers, systems, devices, machines, mainframes, servers or networks, for instance.

As shown in FIG. 3B, the data analysis system 303 may include a number of processing modules 353 configured perform a variety of data processing and analysis. The processing module(s) 353 may process a variety of data and information received or accessed via the I/O module(s) 353, or from the memory module(s) 357, as well as from other systems and devices external to the data analysis system 303. The processing module(s) 353 may also provide processed data and information to respective modules of the data analysis system 303, and other systems and devices external to the data analysis system 303. For example, the processing module(s) 353 may be configured to generate and provide a report to be displayed to a user using the I/O module(s) 303, or stored in the memory module(s) 357. In some implementations, the processing module(s) 353 may be configured to generate a report comprising instructions, data, or information for synchronizing sensor clocks, or sensor data.

In some embodiments, the processing module(s) 353 includes a synchronization module 355, as shown in FIG. 3B. The synchronization module 355 may be configured to synchronize sensors by accessing or receiving various sets of data, such as image data and position data acquired while sensors are moving along a pathway. As described, the image data may be acquired using an image sensor (e.g. a camera), while the position data may be acquired using a position sensor (e.g. a GPS, GNSS receiver/sensor and the like). In some aspects, the image and position sensors are co-located when acquiring the data. The synchronization module 355 may then assemble trajectories using the respective data. In particular, to assemble the image sensor trajectory, the synchronization module 355 may apply an SfM algorithm to the image data. In some aspects, the SfM algorithm may be configured to determine the poses (e.g. positions and orientations) of the image sensor from the image data.

The synchronization module 355 may then generate a spatial transformation that aligns the assembled trajectories. In some implementations, the synchronization module 355 may be configured to apply a point set registration technique to the trajectories to generate the spatial transformation. For instance, in one non-limiting example, the synchronization module 355 may be configured to apply a coherent point drift (CPD) algorithm to generate the transformation. As described, a spatial transformation computed using point set registration technique is distinct from transforms commonly computed using point-to-point correlations techniques. That is, the point set registration approach herein would not pair SfM points with GNSS points, for instance, but rather match the shape, position, and scale of the camera trajectories to the GNSS trajectory.

Using the spatial transformation, the synchronization module 355 may compute timestamp offsets between the image and position data. In some implementations, the synchronization module 355 may be configured to compute the timestamp offsets by assembling one or more 1D timelines using the trajectories. For example, consider two GPS measurements taken at two different times, say with timestamps t=3 and t=4, along a generally two-dimensional (2D) trajectory of a GPS sensor. A one-dimensional (1D) line (i.e. timeline) connecting the 2D GPS points at times t=3 and t=4 may then be assembled (although need not be displayed), with various points along the line corresponding to various times interpolated linearly. Now, an image may be positioned spatially between GPS points 3 and 4, in accordance with the spatial transformation described. The 2D position of the image may then be projected onto the 1D line, and the point on the line dictates the timestamp assigned to the image. For example, if the computed position of the image should fall exactly halfway between points t=3 and t=4 on the line, then a timestamp of t=3.5 may be assigned for the image. Note that such timestamp is assigned entirely independent of the timestamp recorded by the camera used to capture the image. In this manner, image timestamps may then be obtained and used to compute the offsets between the image and position data.

In some implementations, the computed timestamp offsets may be used by the synchronization module 355 to synchronize the image data. Namely, the synchronization module 355 may apply the offsets to modify the image data timestamps. In other implementations, the synchronization module 355 may be configured to synchronize the image sensor to the position sensor. For instance, the synchronization module 355 may generate a report, outputted by way of the I/O modules 351, that includes information for modifying timestamps (e.g. timestamp offsets). In yet other implementations, the report may include instructions or signals for modifying an image sensor clock, thereby modifying the timestamps produced by the clock.

The synchronization module 355 may also be configured to perform synchronization periodically, or as prompted by a user, device or system. Synchronization may also be performed in response to an error in positioning or localization exceeding a pre-defined threshold. In some implementations, synchronization may be performed online or in substantially real-time by way of buffering a certain amount of image and position data, as allowed by hardware, for instance. The process would proceed, for example, by having the synchronization module 355 estimate camera positions using an SfM algorithm, and then aligning the camera positions to GNSS measurements. Using the registered camera positions, the GNSS timestamps may be interpolated for each image frame to calculate a single timestamp offset or bias. The offset may then be added to each subsequent image frame's timestamp to achieve synchronicity. Alternatively, the synchronization module 355 may communicate with other devices, systems or servers that are configured to carry out one or more steps of the synchronization processes described herein in order to optimize hardware resources.

Referring again to FIG. 3B, the data storage module 307 may include one or more memory modules 357 configured for storing and retrieving therefrom a variety of data and information. In some embodiments, the memory module(s) 357 include non-volatile or non-transitory computer readable media, which may include instructions for carrying out steps in accordance with aspects of the present disclosure.

In some implementations, the above-described data analysis system 303 and synchronization module 355 may be embodied in a modestly powerful edge compute device, such as NVIDIA Jetson products, iMX8 and higher boards from NXP, and so forth. However, less powerful edge devices, such as different smartphone devices, may not be able to perform the above synchronization in a satisfactory manner or a suitable timeframe. This is because SfM algorithms, and other processes, often require substantial computational resources. In such cases, the synchronization module 355 may communicate, by way of the I/O module(s) 351 with a service, such as a Visual Positioning Service (VPS). For example, the synchronization module 355 may direct image data to the VPS and receive estimated positions for associated with the data. Such image sensor positions may then be buffered, and synchronization may then be performed using corresponding position measurements, for example, as obtained from an internal GNSS chip or other position sensor.

Figure 4:
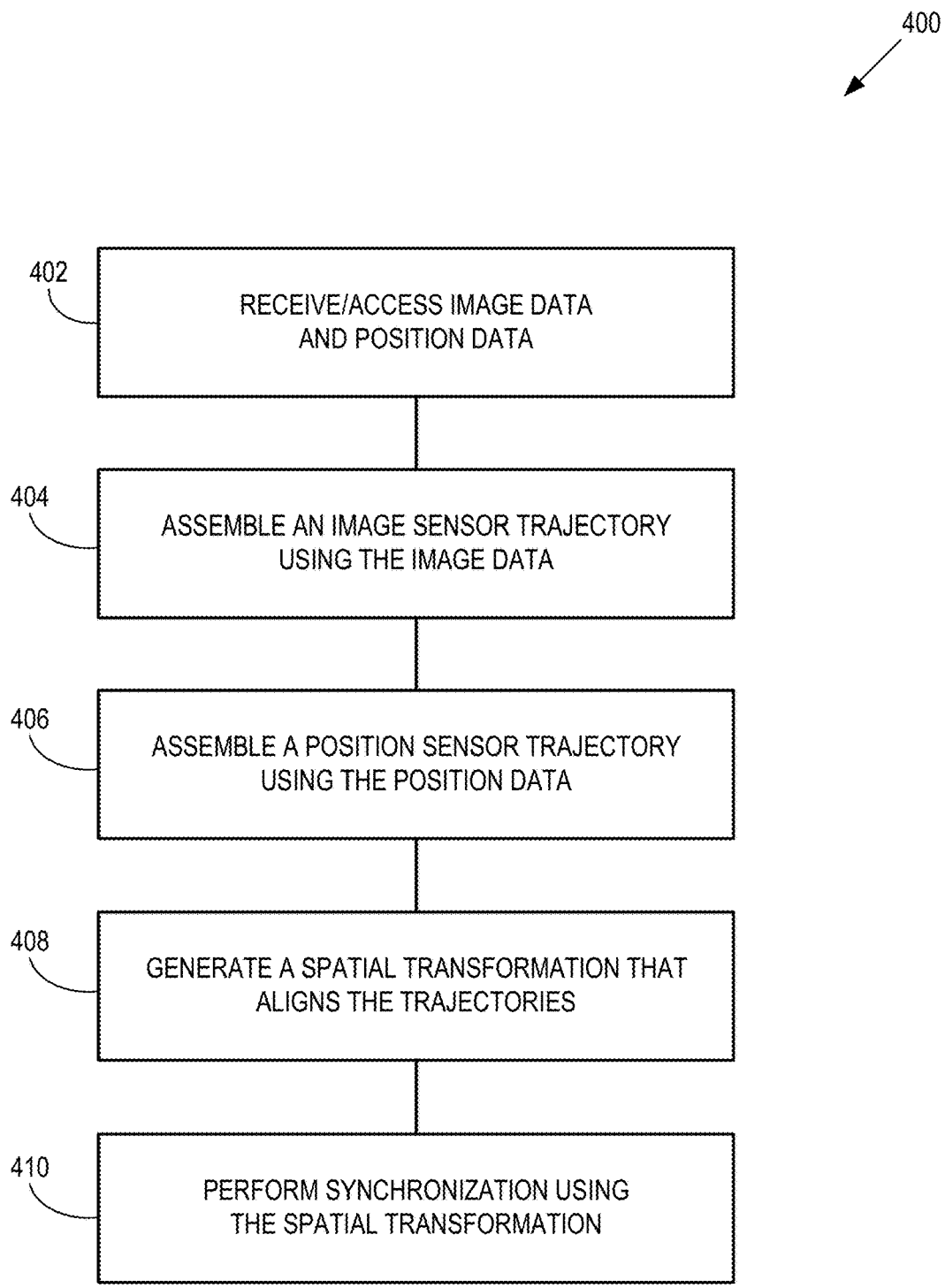
FIG. 4 is a flowchart setting forth steps of a process, in accordance with aspects of the present disclosure.

Turning now to FIG. 4, a flowchart setting forth steps of a process 400, in accordance with aspects of the present disclosure, is illustrated. Steps of the process 400 may be carried out using any combination of suitable devices or systems, as well as using systems described in the present disclosure. In some embodiments, steps of the process 400 may be implemented as instructions stored in non-transitory computer readable media, as a program, firmware or software, and executed by a general-purpose, programmed or programmable computer, processer or other computing device. In other embodiments, steps of the process 400 may be hardwired in an application-specific computer, processer, dedicated system, or module, as described with reference to FIGS. 3A and 3B. Although the process 400 is illustrated and described as a sequence of steps, it is contemplated that the steps may be performed in any order or combination, and need not include all of the illustrated steps.

The process 400 may begin at process block 402 with receiving or accessing image and position data that correspond to a pathway or area of interest. The data may be captured in real-time and/or obtained from, for example, the geographic database 307, the vehicle 305, or a content provider 311, as described with reference to FIG. 3A, as well as from elsewhere (e.g. a memory, server, and so forth). Image data may include any combination of top-down image data, aerial image data, frontal image data, perspective image data, and so forth (e.g. terrestrial images, satellite images, drone images, etc) captured using terrestrial vehicles (e.g. mapping vehicles, and the like), aerial vehicles (e.g. airplanes, drones, and so forth), satellites, ground surveyors, device end-users, and other equipment or methods.

In some aspects, the image data may include multiple images (e.g. color and/or grayscale) depicting the same feature(s) captured from various perspectives and/or using various image sensors or sources. The received or accessed data may also include sets of images, or series of video frames or streams, as well as other information, such as timestamps reflecting the date and/or time of image capture. The position data may be obtained using a variety of position sensors, such as GPS, GNSS sensors, and others. The position data may be include sequences or sets of position measurements (e.g. latitude, longitude, altitude), respective timestamps, as well as other information.

In accordance with aspects of the present disclosure, the data received/accessed at process block 402 is asynchronous. The image and position data may be captured while the image and position sensors are co-located and traveling together along the pathway. Alternatively, the image data and position data may be captured while the sensors travel separately along the same pathway (i.e. captured at different times).

Using the image data and position data acquired at process block 402, image sensor and position sensor trajectories are assembled at process blocks 404 and 406, respectively. In some implementations, each assembled trajectory contains a set of positions corresponding to its respective sensor. Particularly with respect to the image sensor trajectory, an SfM algorithm may be applied to the image data to assemble the trajectory. The SfM algorithm may be configured to determine the poses (e.g. positions and orientations) of the image sensor that captured the image data. The poses computed by the SfM algorithm may then be used to assemble the set of positions forming the image sensor trajectory.

Then, at process block 408, a spatial transformation is generated. As described, the spatial transformation is generated to align the trajectories at process blocks 404 and 406. In some aspects, the spatial transformation matches the two trajectories in scaling, rotation and translation. To generate the spatial transformation, a point set registration technique may be applied. As described, a point set approach provides improved results and is robust to outliers, compared to point matching. In one non-limiting example, a coherent point drift (CPD) algorithm may be used to generate the spatial transformation at process block 408.

Synchronization may then be carried out using the spatial transformation, as indicated by process block 410. Specifically, with the image sensor trajectory being aligned with the position sensor trajectory, by way of the spatial transformation, accurate position estimates are obtained for the image sensor. For instance, each estimated position reflects a camera position when a given video frame was captured by the camera along the pathway. The position estimates, along with corresponding timestamps, may then be used to provide the synchronization. In some aspects, the estimated positions for the image sensors may then be used to correct asynchronicity by using the timestamps of the position sensor. In particular, timestamp offsets between the image and position data may be computed at process block 410. In some implementations, the timestamp offsets may be used to synchronize the image data to the position data by performing a correction that modifies the image data timestamps. In other implementations, synchronization may involve modifying a clock of the image sensor, by way of a signal that can automatically result in the adjustment of the clock, or by providing instructions for a user, or other system or device to do so.

In some aspects, a report may also be generated. The report may be in any form, and provide various information. In some implementations, the report may be in the form of visual and/or audio signals, images, tabulated information and data, instructions, and combinations thereof. For instance, the report may include information for modifying timestamps provided by the image sensor. The report may also include image and position data, timestamps, uncertainties and so forth, assembled as graphs, images, tables, trajectories, and other representations. The report may be communicated to a user or operator by way of a display, speakers, or other means of output, as well as to various devices or systems for further steps, analysis or processing. To this end, the report may include data, instructions, or signals for synchronization, including for modifying an image sensor clock or image data. In some aspects, the report may be provided in real-time (e.g. substantially as data is being captured). The report, and various data and information therein, may also be stored (e.g. in a memory, a database, a server, and so forth).

Process blocks 402-410 may be repeated periodically or performed intermittently, or as prompted by a user, device or system. Synchronization may also be performed in response to an error in positioning or localization exceeding a predefined threshold. In some implementations, synchronization may be performed online or in substantially real-time by way of buffering a limited set of image and position data.

Figure 5:
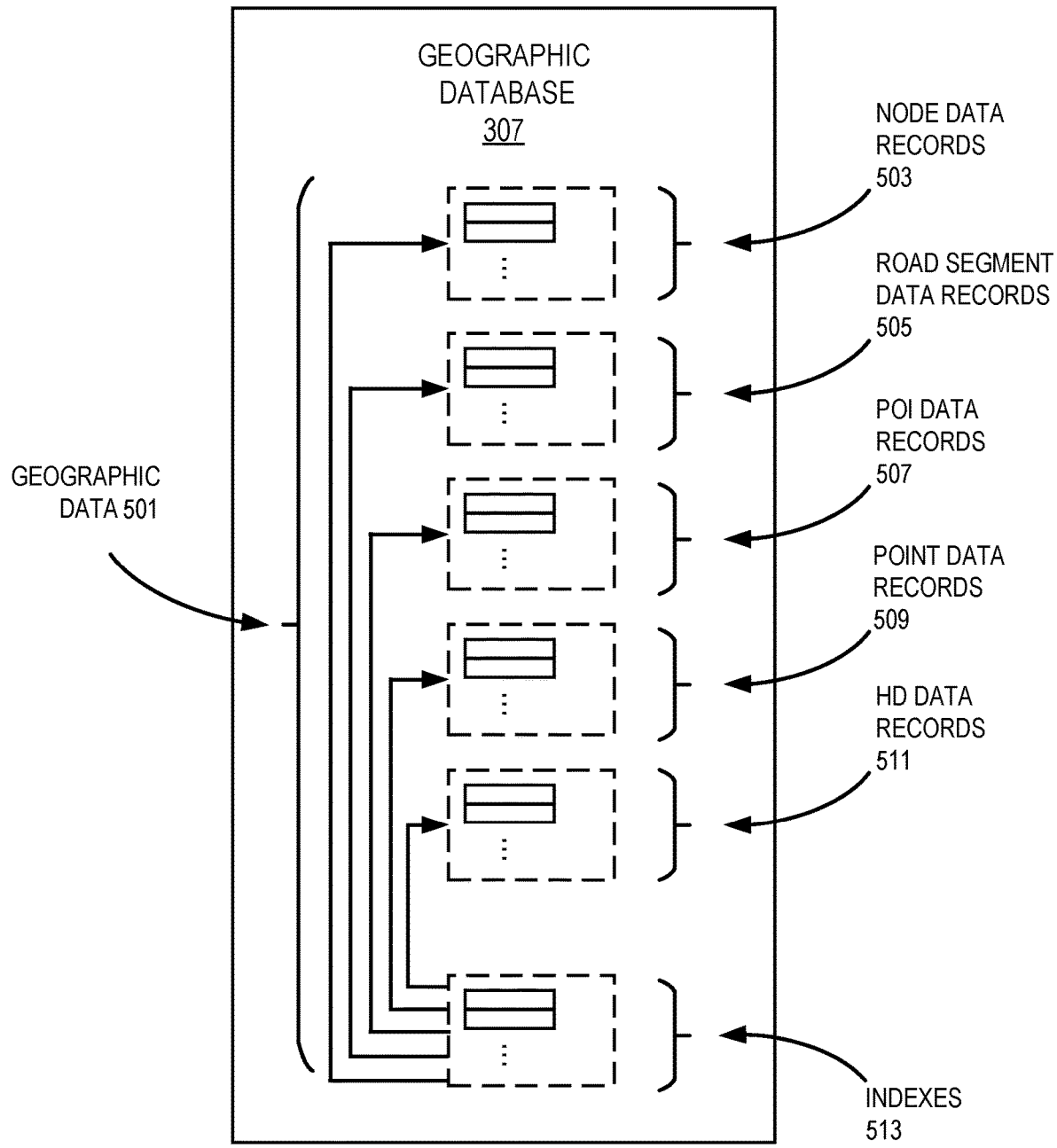
FIG. 5 is a diagram of an example geographic database, in accordance with aspects of the present disclosure.

Turning now to FIG. 5, a diagram of a geographic database 307, according to aspects of the present disclosure, is shown. As shown, the geographic database 307 may include a variety of geographic data 501 tabulated in various arrangements, and used in various applications. For example, the geographic data 501 may be used for (or configured to be compiled to be used for) mapping and/or navigation-related services. As shown in FIG. 5, the geographic data 501 may include node data records 503, road segment data records 505, point of interest (POI) data records 507, point data records 509, high definition (HD) mapping data records 511, and indexes 513, for example. The geographic data 501 may include more, fewer or different data records. In some embodiments, additional data records (not shown in FIG. 5 (not shown in FIG. 5) may also be included, such as cartographic ("carto") data records, routing data records, maneuver data records, and other data records.

In particular, the HD mapping data records 511 may include a variety of data, including data with resolution sufficient to provide centimeter-level or better accuracy of map features. For example, the HD mapping data may include data captured using LiDAR, or equivalent technology capable large numbers of 3D points, and modelling road surfaces and other map features down to the number lanes and their widths. In one embodiment, the HD mapping data (e.g., HD data records 511) capture and store details such as the slope and curvature of the road, lane markings, roadside objects such as signposts, including what the signage denotes. By way of example, the HD mapping data enable highly automated vehicles to precisely localize themselves on the road.

In some implementations, geographic features (e.g., two-dimensional or three-dimensional features) may be represented in the geographic database 307 using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 307:

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In some implementations, certain conventions or rules may be followed in the geographic database 307. For example, links may not cross themselves or each other except at a node. In another example, shape points, nodes, or links may not be duplicated. In yet another example, two links that connect each other may have a common node. In the geographic database 307, overlapping geographic features are represented by overlapping polygons. When polygons overlap, the boundary of one polygon crosses the boundary of the other polygon.

In the geographic database 307, the location at which the boundary of one polygon intersects the boundary of another polygon may be represented by a node. In one embodiment, a node may be used to represent other locations along the boundary of a polygon than a location at which the boundary of the polygon intersects the boundary of another polygon. In one embodiment, a shape point may not be used to represent a point at which the boundary of a polygon intersects the boundary of another polygon.

In exemplary embodiments, the road segment data records 505 may be links or segments representing roads, streets, or pathways, as can be used in the calculated route or recorded route information for determination of one or more personalized routes. The node data records 503 may be end points corresponding to the respective links or segments of the road segment data records 505. The road link data records 505 and the node data records 503 may represent a road network, as used by vehicles, cars, and/or other entities, for instance. Alternatively, the geographic database 307 may contain pathway segment and node data records or other data that represent pedestrian pathways or areas in addition to or instead of the vehicle road record data, for example.

The road/link segments and nodes can be associated with attributes, such as functional class, a road elevation, a speed category, a presence or absence of road features, geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 307 can include data about the POIs and their respective locations in the POI data records 507. The geographic database 307 can also include data about places, such as cities, towns, or other communities, and other geographic features, such as bodies of water, mountain ranges, etc. Such place or feature data can be part of the POI data records 507 or can be associated with POIs or POI data records 507 (such as a data point used for displaying or representing a position of a city).

As shown in FIG. 5, the geographic database 307 may also include point data records 509 for storing the point data, map features, as well as other related data used according to the various embodiments described herein. In addition, the point data records 509 can also store ground truth training and evaluation data, machine learning models, annotated observations, and/or any other data. By way of example, the point data records 509 can be associated with one or more of the node records 503, road segment records 505, and/or POI data records 507 to support verification, localization or visual odometry based on the features stored therein and the corresponding estimated quality of the features. In this way, the records 509 can also be associated with or used to classify the characteristics or metadata of the corresponding records 503, 505, and/or 507.

As discussed above, the HD mapping data records 511 may models of road surfaces and other map features to centimeter-level or better accuracy. The HD mapping data records 511 may also include models that provide the precise lane geometry with lane boundaries, as well as rich attributes of the lane models. These rich attributes may include, but are not limited to, lane traversal information, lane types, lane marking types, lane level speed limit information, and/or the like. In one embodiment, the HD mapping data records 511 may be divided into spatial partitions of varying sizes to provide HD mapping data to vehicles and other end user devices with near real-time speed without overloading the available resources of these vehicles and devices (e.g., computational, memory, bandwidth, etc. resources). In some implementations, the HD mapping data records 511 may be created from high-resolution 3D mesh or point-cloud data generated, for instance, from LiDAR-equipped vehicles. The 3D mesh or point-cloud data may be processed to create 3D representations of a street or geographic environment at centimeter-level accuracy for storage in the HD mapping data records 511.

In one embodiment, the HD mapping data records 511 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

The geographic database 307 may be maintained by content provider in association with a services platform (e.g., a map developer), as described with reference to FIG. 3. The map developer can collect geographic data to generate and enhance the geographic database 307. The data may be collected in various ways by the map developer, including obtaining data from other sources, such as municipalities or respective geographic authorities. In addition, the map developer can employ field personnel to travel by vehicle along roads throughout the geographic area of interest to observe features and/or record information about them, for example. Also, remote sensing, such as aerial or satellite photography, can be used.

In some implementations, the geographic database 307 can be a master geographic database stored in a format that facilitates updating, maintenance, and development. For example, the master geographic database or data in the master geographic database can be in an Oracle® spatial format or other spatial format, such as for development or production purposes. The Oracle® spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device of a vehicle, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The indexes 513 in FIG. 5 may be used improve the speed of data retrieval operations in the geographic database 307. Specifically, the indexes 513 may be used to quickly locate data without having to search every row in the geographic database 307 every time it is accessed. For example, in one embodiment, the indexes 513 can be a spatial index of the polygon points associated with stored feature polygons.

Figure 6:
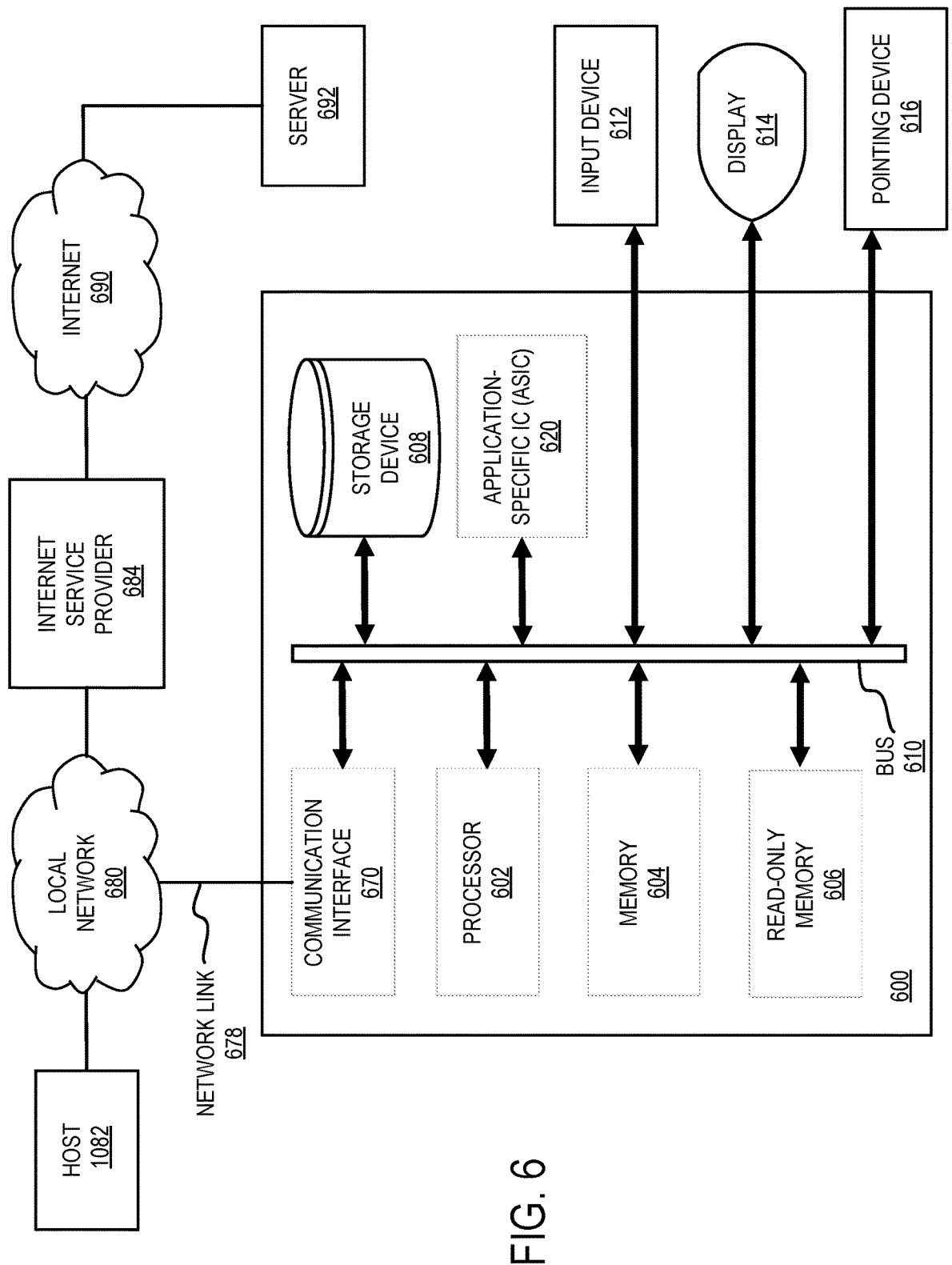
FIG. 6 is a diagram of an example computer system, in accordance with aspects of the present disclosure.

Turning now to FIG. 6, an example computer system 600, in accordance with aspects of the present disclosure, is illustrated in FIG. 6. The computer system 600 may be programmed (e.g., via computer program code or instructions) to perform a variety of steps, including steps for synchronization, in accordance with methods described herein.

As shown in FIG. 6, the computer system 600 may generally include a processor 602, which may be configured to perform a set of operations on information as specified by computer program code. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). In some aspects, the set of operations may include bringing information in from a bus 610 and placing information on the bus 610. The set of operations may also include comparing two or more units of information, shifting positions of units of information, and combining two or more units of information, such as by addition or multiplication or logical operations like OR, exclusive OR (XOR), and AND. Each operation of the set of operations performed by the processor 602 may be represented to the processor 602 by information called instructions, such as an operation code of one or more digits. The sequence of operations to be executed by the processor 602, such as a sequence of operation codes, constitute processor 602 instructions, may also be called computer system 600 instructions or, simply, computer instructions. The processor 602 may include multiple processors, units or modules, and may be implemented as mechanical, electrical, magnetic, optical, chemical or quantum components, among others, or any combination thereof.

As shown in FIG. 6, the computer system 600 may also include a memory 604 coupled to bus 610. The memory 604, such as a random-access memory (RAM) or other dynamic storage device, may be configured to store a variety of information and data, including processor instructions for carrying steps in accordance with aspects of the disclosure. Dynamic memory allows information stored therein to be changed by the computer system 600. The RAM allows a unit of information stored at a location called a memory address to be stored and retrieved independently of information at neighboring addresses. The memory 604 may also be used by the processor 602 to store temporary values during execution of processor instructions.

The computer system 600 may also include a read-only memory (ROM) 606, or other static storage device, coupled to the bus 610. The ROM 606 may be configured for storing static information, including instructions, that is not changed by the computer system 600. Some memory 604 includes volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

As mentioned, the bus 610 may be configured for passing information and data between internal and external components of the computer system 600. To do so, the bus 610 may include one or more parallel conductors that facilitate quick transfer of information and data among the components coupled to the bus 610. The information and data may be represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, may represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, analog data may be represented by a near continuum of measurable values within a particular range.

Information, including instructions for synchronization, may be provided to the bus 610 for use by the processor 602 from an external input device 612, such as a keyboard or other sensor. The sensor may be configured to detect conditions in its vicinity and transform those detections into physical expression compatible with the measurable phenomenon used to represent information in computer system 600. Other external devices coupled to bus 610, used primarily for interacting with humans, may include a display device 614, such as a cathode ray tube (CRT) or a liquid crystal display (LCD), or plasma screen or printer for presenting text or images, as well as a pointing device 616 (e.g. a mouse, trackball, cursor direction keys, motion sensor, etc) for controlling a position of a small cursor image presented on the display 614 and issuing commands associated with graphical elements presented on the display 614. In some embodiments, for example, the computer system 600 performs all functions automatically without human input. As such, one or more of external input device 612, display device 614 and pointing device 616 may be omitted.

As shown in FIG. 6, special purpose hardware, such as an application specific integrated circuit (ASIC) 620, may be coupled to bus 610. The special purpose hardware may be configured to perform specialized operations. Examples of ASICs include graphics accelerator cards for generating images for display 614, cryptographic boards for encrypting and decrypting messages sent over a network, speech recognition, and interfaces to special external devices.

The computer system 600 may also include one or more instances of a communications interface 670 coupled to bus 610. The communication interface 670 may provide a one-way or two-way communication coupling to a variety of external devices that operate with their own processors, such as printers, scanners and external disks. In addition, the communication interface 670 may provide a coupling to a local network 680, by way of a network link 678. The local network 680 may provide access to a variety of external devices and systems, each having their own processors and other hardware. For example, the local network 680 may provide access to a host 682, or an internet service provider 684, or both, as shown in FIG. 6. The internet service provider 684 may then provide access to the internet 690, in communication with various other servers 692.

By way of example, the communication interface 670 may include a parallel port or a serial port or a universal serial bus (USB) port on a personal computer. In some embodiments, the communications interface 670 may include one or more integrated services digital network (ISDN) cards, or digital subscriber line (DSL) cards, or telephone modems that provides an information communication connection to a corresponding type of telephone line.

In some embodiments, the communication interface 670 may include a cable modem that converts signals on bus 610 into signals for a communication connection over a coaxial cable or into optical signals for a communication connection over a fiber optic cable. As another example, the communications interface 670 may be a local area network (LAN) card configured to provide a data communication connection to a compatible LAN, such as Ethernet. Wireless links may also be implemented. For wireless links, the communications interface 670 may send and/or receive electrical, acoustic or electromagnetic signals, including infrared and optical signals, that carry information streams, including digital data. For example, in wireless handheld devices (e.g. mobile telephones, cell phones, and so forth), the communications interface 670 may include a radio band electromagnetic transmitter and receiver called a radio transceiver. In certain embodiments, the communications interface 670 enables connection to the communication network, as described with reference to FIG. 3.

As used herein, computer-readable media refers to any media that participates in providing information to processor 602, including instructions for execution. Such media may take many forms, and include non-volatile media, volatile media, transmission media, and others. Non-volatile media include, for example, optical or magnetic disks, such as storage device 608. Volatile media include, for example, dynamic memory 604. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Figure 7:
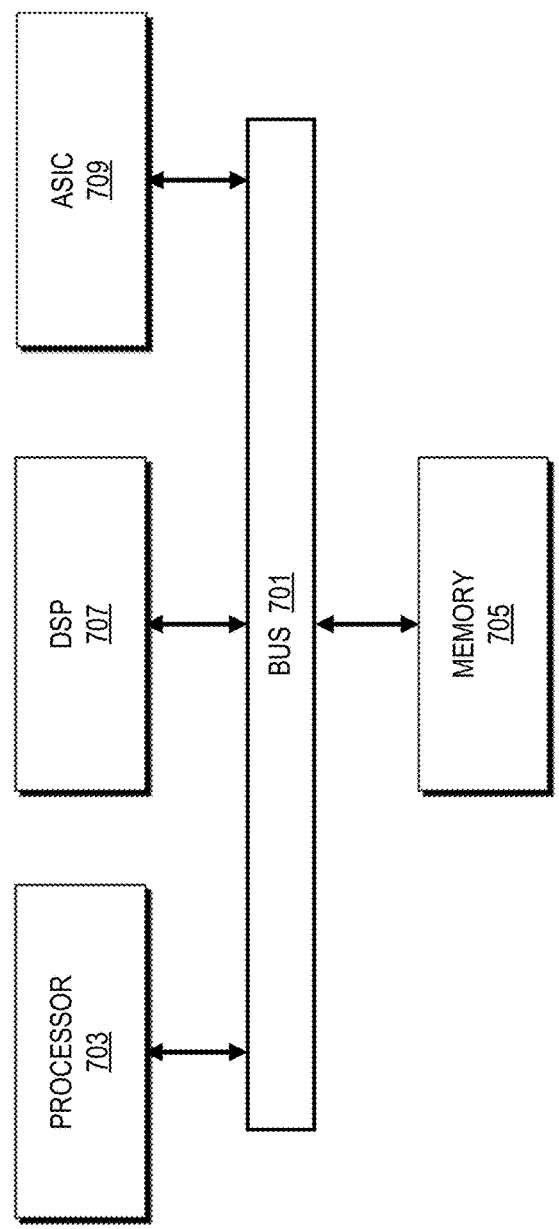
FIG. 7 is a diagram of an example chip set, in accordance with aspects of the present disclosure.

Turning now to FIG. 7, a chip set 700, in accordance with aspects of the present disclosure, is illustrated. In some implementations, the chip set 700 may be programmed to carry out steps in accordance with methods described herein, and may include various components (e.g. as described with respect to FIG. 6) incorporated in one or more physical packages (e.g., chips). By way of example, a physical package includes an arrangement of one or more materials, components, and/or wires on a structural assembly (e.g., a baseboard) that provides one or more characteristics, such as physical strength, conservation of size, and/or limitation of electrical interaction. It is contemplated that in certain embodiments the chip set 700 can be implemented in a single chip.

As shown, the chip set 700 may include a communication mechanism, such as a bus 701 for passing information and data among the components of the chip set 700. A processor 703 connected to the bus 701 may be configured to execute instructions and process information stored in, for example, a memory 705. The processor 703 may include one or more processing cores, with each core capable of performing independently. In some implementations, a multi-core processor may be used, which enables multiprocessing within a single physical package. Examples of a multi-core processor include two, four, eight, or greater numbers of processing cores. Alternatively, or additionally, the processor 703 may include one or more microprocessors configured in tandem, via the bus 701, to perform independent execution of instructions, pipelining, and multithreading.

The chip set 700 may also include specialized components configured to perform certain processing functions and tasks. For instance, the chip set 700 may include one or more digital signal processors (DSP) 707, or one or more application-specific integrated circuits (ASIC) 709, or both. In particular, the DSP 707 may be configured to process real-world signals (e.g., sound) in real time independently of the processor 703. Similarly, the ASIC 709 may be configured to performed specialized functions not easily performed by a general-purpose processor. Other specialized components to aid in performing the inventive functions described herein may include one or more field programmable gate arrays (FPGA) (not shown), one or more controllers (not shown), or one or more other special-purpose computer chips.

The processor 703 and accompanying components may have connectivity to the memory 705 via the bus 701, as shown. The memory 705 may include dynamic memory (e.g., RAM, magnetic disk, writable optical disk, etc.), static memory (e.g., ROM, CD-ROM, etc.), and others, configured for storing executable instructions. The instructions, when executed, perform a variety of steps, including steps for identifying the quality of terrestrial data, in accordance with methods described herein. The memory 705 may also store the data associated with or generated by the execution.

Figure 8:
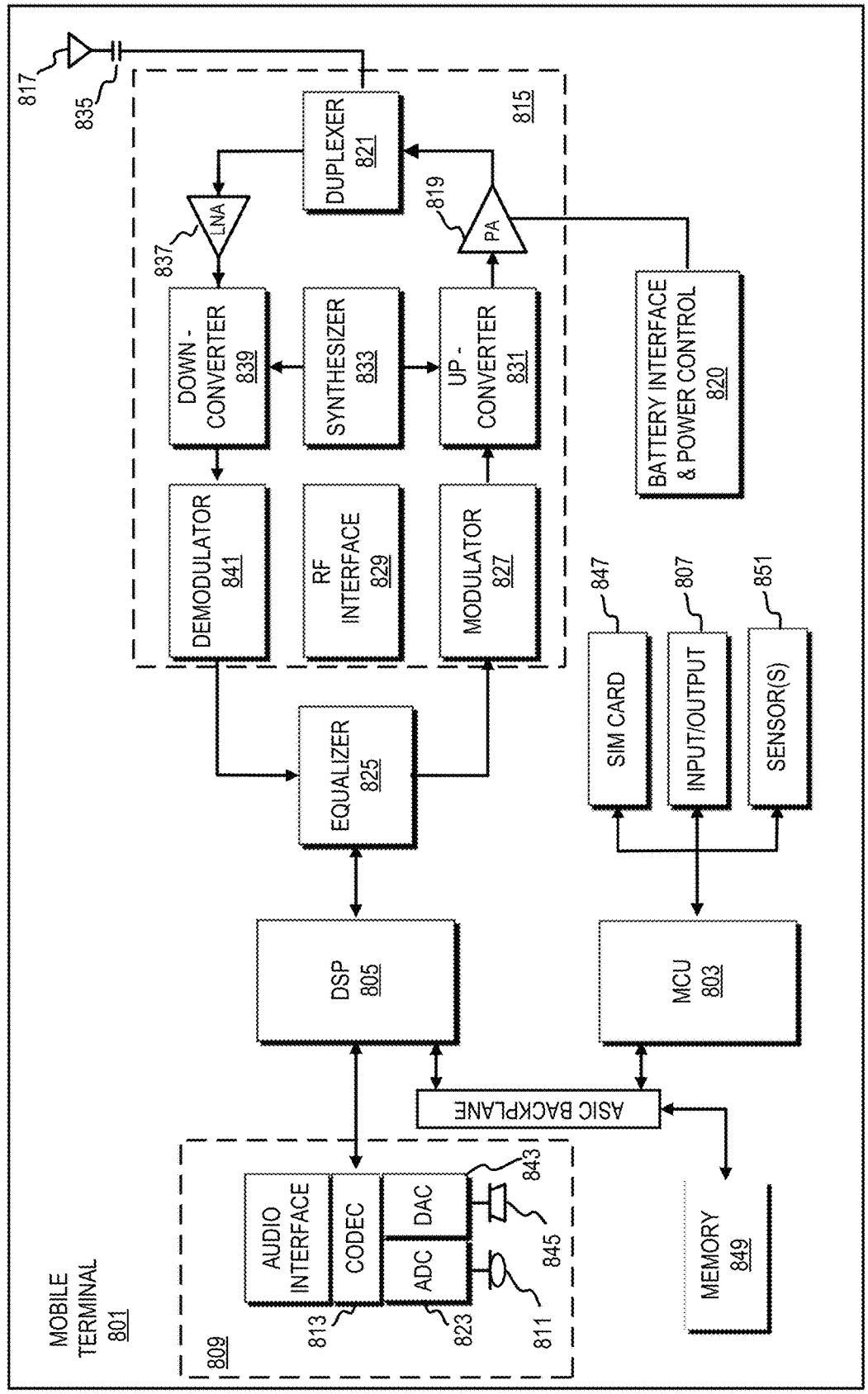
FIG. 8 is a diagram of an example mobile device, in accordance with aspects of the present disclosure.

Turning now to FIG. 8, a diagram of example mobile device 801, in accordance with aspects of the present disclosure, is shown. In some implementations, the mobile device 801 may be a handhold cellular phone, smart phone, tablet, and so forth. Alternatively, the mobile device 801 may be an embedded component of the vehicle 305 or UE 309, as described with reference to FIG. 3.

In general, the mobile device 801 may include a Main Control Unit (MCU) 803, a Digital Signal Processor (DSP) 805, a number of input/output components 807. In some configurations, input/output components 807 (e.g. a display, touchscreen, keyboard, etc) are configured to provide feedback to user in support of various applications and functions of the mobile device 801. The mobile device 801 may also include audio function circuitry 809, including a microphone 811 and microphone amplifier that amplifies the sound signal output from the microphone 811. The amplified sound signal output from the microphone 811 is fed to a coder/decoder (CODEC) 813. In some embodiments, the audio function circuitry 809 may include a receiver/transmitter unit including a microphone gain control unit and a speaker gain control unit.

The mobile device 801 may also include a radio section 815, which amplifies power and converts frequency in order to communicate with a base station, which is included in a mobile communication system, via antenna 817. Generally, a radio receiver is often defined in terms of front-end and back-end characteristics. The front-end of the receiver encompasses all of the Radio Frequency (RF) circuitry whereas the back-end encompasses all of the base-band processing circuitry. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile station 801 speaks into the microphone 811 and his or her voice along with any detected background noise is converted into an analog voltage. The analog voltage is then converted into a digital signal through the Analog to Digital Converter (ADC) 823. The MCU 803 routes the digital signal into the DSP 805 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE®) networks, code division multiple access (CDMA), wireless fidelity (Wi-Fi®), satellite, and the like.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, other mobile phone or a landline connected to a Public Switched Telephone Network (PSTN), or other telephony networks.

Voice signals transmitted to the mobile station 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803—which can be implemented as a Central Processing Unit (CPU) (not shown).

As shown in FIG. 8, the MCU 803 is in communication with various input/output components 807 may be configured to receive various signals therefrom and send signals thereto. The MCU 803, input/output components 807, in combination with other user input components (e.g., the microphone 811), comprise a user interface circuitry for managing user input. The MCU 803 may run a user interface software to facilitate user control of at least some functions of the mobile station 801. The MCU 803 may also deliver a display command and a switch command to the input/output components 807 and to the speech output switching controller, respectively. Further, the MCU 803 may exchange information with the DSP 805 and can access an optionally incorporated SIM card 847 and a memory 849. In addition, the MCU 803 may execute various control functions required. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile station 801.

The CODEC 813 may include the ADC 823 and DAC 843. The memory 849 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory 851 may be, but not is limited to, a single memory, CD, DVD, ROM, RAM, EEPROM, optical storage, or any other non-volatile or non-transitory storage medium capable of storing digital data.

An optionally incorporated SIM card 847 may carry, for instance, important information, such as the cellular phone number, the carrier supplying service, subscription details, and security information. The SIM card 847 serves primarily to identify the mobile station 801 on a radio network. The SIM card 847 also contains a memory for storing a personal telephone number registry, text messages, and user specific mobile station settings.

In some embodiments, the mobile device 801 may also include a number of sensors 851. For instance, the mobile device 801 may include one or more image sensors (e.g. camera(s), position sensors (e.g. GNSS or GPS), proximity sensors, light sensors, fingerprint sensors, accelerometer sensors, Hall effect sensors, a barometer, a compass, and many others. As shown, the MCU 803 may be in communication with such sensors 851, for instance, by way of a communication network or bus. In some implementations, the MCU 803 may be configured to control the operation of the sensors 851, as well as receive and transmit data and information corresponding with data captured by the sensors 851.

In some implementations, the MCU 803 may be configured to process, store, and/or transmit image data provided by an image sensor 807. For example, the MCU 803 may direct a camera to acquire a series of image frames while the mobile terminal 801 is moving along a pathway. The MCU 803 may tag the image data with a variety of information, including timestamps, positions, orientations, etc. As such, the MCU 803 may include or have access to a clock, position data, orientation data, and so forth. In some embodiments, the MCU 803 may be configured to carry out synchronization, in accordance with methods described herein. To this end, the MCU 803 may access or receive position data, and process the position data, along with the image data, including assembling trajectories, computing spatial transformations, and synchronizing, as described. For instance, a clock responsive to the MCU 803 and/or the image data may be synchronized in accordance with the processing performed.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order. It should be appreciated that many equivalents, alternatives, variations, and modifications, aside from those expressly stated, are possible and may be considered within the scope of the invention.

The invention claimed is:

1. A method for synchronizing an image sensor, the method comprising:
receiving image data captured using an image sensor that is moving along a pathway;
assembling an image sensor trajectory by applying a structure-from-motion algorithm to the image data to generate a plurality of positions forming the image sensor trajectory, wherein the plurality of positions indicates a plurality of estimated positions in which images were captured by the image sensor as the image sensor move along the pathway, and wherein the image sensor trajectory indicates a plurality of timestamps in which the images were captured by the image sensor;
receiving position data acquired along the pathway using a position sensor, wherein timestamps for the image data and position data are asynchronous;
assembling a position sensor trajectory using the position data, wherein the position sensor trajectory indicates a plurality of positions in which position measurements were captured by the position sensor as the position sensor move along the pathway and a plurality of timestamps in which the position measurements were captured by the position sensor, and wherein the position sensor trajectory is a Global Navigation Satellite System (GNSS) data acquired along the pathway;
generating a spatial transformation that aligns the image sensor trajectory and position sensor trajectory by applying a coherent point drift algorithm to the image sensor trajectory and position sensor trajectory, wherein the coherent point drift algorithm matches a shape, position, and scale of the image sensor trajectory to the position sensor trajectory; and
synchronizing the image sensor based on the spatial transformation.

2. The method of claim 1, wherein the method further comprises acquiring the image data and the position data while the image sensor and position sensor are co-located.

3. The method of claim 1, wherein the method further computing a timestamp offset between the image sensor and position sensor.

4. The method of claim 3, wherein the method further comprises applying the timestamp offset to timestamps of image data acquired by the image sensor.

5. A system comprising:
a camera configured to capture image data, wherein the camera comprises a camera clock configured to generate timestamps corresponding to the image data;
a processor in communication with the camera;
at least one memory comprising instructions executable by the processor, the instructions causing the processor to:
receive image data captured using the camera while the camera is moving along a pathway;
assemble a camera trajectory by applying a structure-from-motion algorithm to the image data to generate a plurality of positions forming the camera trajectory, wherein the plurality of positions indicates a plurality of estimated positions in which images were captured by the camera as the camera move along the pathway, and wherein the camera trajectory indicates a plurality of timestamps in which the images were captured by the camera;
receive position data acquired along the pathway using a position sensor, wherein timestamps for the image data and position data are asynchronous;
assemble a position sensor trajectory using the position data, wherein the position sensor trajectory indicates a plurality of positions in which position measurements were captured by the position sensor as the position sensor move along the pathway and a plurality of timestamps in which the position measurements were captured by the position sensor, and wherein the position sensor trajectory is a Global Navigation Satellite System (GNSS) data acquired along the pathway;
generate a spatial transformation that aligns the camera trajectory and position sensor trajectory by applying a coherent point drift algorithm to the camera trajectory and position sensor trajectory, wherein the coherent point drift algorithm matches a shape, position, and scale of the camera trajectory to the position sensor trajectory; and
synchronize the camera based on the spatial transformation.

6. The system of claim 5, wherein the system further comprises the position sensor that is co-located with the camera.

7. The system of claim 5, wherein the instructions further cause the processor to compute a timestamp offset between the camera and position sensor.

8. The system of claim 7, wherein the instructions further cause the processor to apply the timestamp offset to timestamps of image data acquired by the camera.

9. The system of claim 8, wherein the instructions further cause the processor to synchronize the camera clock using the timestamp offset.

10. A non-transitory computer-readable storage medium for synchronizing a camera sensor, carrying one or more sequences of one or more instructions which, when executed by one or more processors, cause a system to perform steps to:
receive image data captured using an image sensor that is moving along a pathway;
generate an image sensor trajectory by applying a structure-from-motion algorithm to the image data to generate a plurality of positions forming the image sensor trajectory, wherein the plurality of positions indicates a plurality of estimated positions in which images were captured by the image sensor as the image sensor move along the pathway, and wherein the image sensor trajectory indicates a plurality of timestamps in which the images were captured by the image sensor;
receive position data acquired along the pathway using a position sensor, wherein timestamps for the image data and position data are asynchronous;
assemble a position sensor trajectory using the position data, wherein the position sensor trajectory indicates a plurality of positions in which position measurements were captured by the position sensor as the position sensor move along the pathway and a plurality of timestamps in which the position measurements were captured by the position sensor, and wherein the position sensor trajectory is a Global Navigation Satellite System (GNSS) data acquired along the pathway;
generate a spatial transformation that aligns the image sensor trajectory and position sensor trajectory by applying a coherent point drift algorithm to the image sensor trajectory and position sensor trajectory, wherein the coherent point drift algorithm matches a shape, position, and scale of the image sensor trajectory to the position sensor trajectory; and synchronize the image sensor using the spatial transformation.

* * * * *